(12) United States Patent
Goldsmith et al.

(10) Patent No.: US 9,953,304 B2
(45) Date of Patent: Apr. 24, 2018

(54) SITUATIONAL AND GLOBAL CONTEXT AWARE CALENDAR, COMMUNICATIONS, AND RELATIONSHIP MANAGEMENT

(71) Applicant: Buzd, LLC, Fresno, CA (US)

(72) Inventors: David Goldsmith, Manilus, NY (US); Gary Stephen Shuster, Fresno, CA (US)

( * ) Notice: Subject to any disclaimer, the term of this patent is extended or adjusted under 35 U.S.C. 154(b) by 136 days.

(21) Appl. No.: 14/032,621

(22) Filed: Sep. 20, 2013

(65) Prior Publication Data

US 2014/0189016 A1   Jul. 3, 2014

Related U.S. Application Data

(60) Provisional application No. 61/747,348, filed on Dec. 30, 2012, provisional application No. 61/790,249, filed on Mar. 15, 2013.

(51) Int. Cl.
| | |
|---|---|
| *G06F 15/16* | (2006.01) |
| *G06Q 10/10* | (2012.01) |
| *H04L 29/08* | (2006.01) |
| *G06Q 10/06* | (2012.01) |

(52) U.S. Cl.
CPC ......... *G06Q 10/1095* (2013.01); *G06Q 10/06* (2013.01); *G06Q 10/0635* (2013.01); *H04L 67/22* (2013.01); *H04L 67/306* (2013.01)

(58) Field of Classification Search
CPC .................................................. G06K 9/00771
USPC .......................................................... 709/205
See application file for complete search history.

(56) References Cited

U.S. PATENT DOCUMENTS

| | | | | |
|---|---|---|---|---|
| 6,581,037 | B1 * | 6/2003 | Pak | G09B 23/28 705/1.1 |
| 8,670,018 | B2 * | 3/2014 | Cunnington | G06Q 10/10 348/14.08 |
| 2005/0266891 | A1 * | 12/2005 | Mullen | H04M 1/72527 455/567 |
| 2007/0100595 | A1 * | 5/2007 | Earles et al. | 703/13 |
| 2007/0188901 | A1 * | 8/2007 | Heckerman et al. | 360/23 |
| 2007/0226034 | A1 | 9/2007 | Khan | |
| 2008/0153474 | A1 | 6/2008 | Scott | |
| 2008/0169929 | A1 * | 7/2008 | Albertson et al. | 340/573.1 |

(Continued)

FOREIGN PATENT DOCUMENTS

EP    1071055    12/2004

OTHER PUBLICATIONS

International Search Report and Written Opinion issued in PCT/US2013/078122, dated May 13, 2014.

*Primary Examiner* — Hamza Algibhah
(74) *Attorney, Agent, or Firm* — Sherrie Flynn; Coleman & Horowitt LLP

(57) ABSTRACT

A situational and global context aware calendar, communications, and/or relationship management method and system is disclosed. The system is configured to receive from at least one environmental data gathering device, data about at least one target participant at a gathering of a plurality of participants, analyze such data to determine at least one observed behavior of said target participant, compare said at least one observed behavior against a dataset of at least one behavior; determine when said at least one behavior exceeds a threshold similarity to at least behavior in said dataset; and communicate, to at least one notification device, said at least one observed behavior.

20 Claims, 2 Drawing Sheets

(56) References Cited

U.S. PATENT DOCUMENTS

| | | | |
|---|---|---|---|
| 2010/0057562 A1 | 3/2010 | Gabbay | |
| 2011/0292162 A1* | 12/2011 | Byun | H04N 7/15 348/14.08 |
| 2011/0295392 A1* | 12/2011 | Cunnington | G06Q 10/10 700/90 |
| 2012/0161969 A1* | 6/2012 | Husen et al. | 340/573.1 |
| 2012/0252533 A1 | 10/2012 | Lai | |
| 2013/0002869 A1* | 1/2013 | Yuasa et al. | 348/143 |
| 2013/0164722 A1* | 6/2013 | Yoshimitsu et al. | 434/236 |
| 2014/0049389 A1* | 2/2014 | Weadock et al. | 340/539.12 |
| 2014/0278455 A1* | 9/2014 | Chandrasekaran et al. | 705/2 |
| 2014/0314278 A1* | 10/2014 | Tatsuzawa et al. | 382/103 |
| 2014/0335490 A1* | 11/2014 | Baarman et al. | 434/236 |
| 2014/0351337 A1* | 11/2014 | Pal et al. | 709/204 |
| 2015/0051948 A1* | 2/2015 | Aizono et al. | 705/7.29 |

* cited by examiner

SITUATIONAL AND GLOBAL CONTEXT AWARE CALENDAR, COMMUNICATIONS, AND RELATIONSHIP MANAGEMENT

CROSS-REFERENCE TO RELATED APPLICATIONS

This application claims priority from provisional U.S. Pat. App. No. 61/747,348, filed on Dec. 30, 2012, and from provisional U.S. Pat. App. No. 61/790,249, filed on Mar. 15, 2013. Both applications are hereby incorporated by reference in their entirety.

TECHNICAL FIELD

The present disclosure relates to calendar management, and particularly to context aware calendar and relationship management.

BACKGROUND

Customer relationship management software ("CRM") systems are frequently used to manage calendars, meetings, and even relationships. CRM is frequently described as a strategy for managing a company's interactions with customers, clients and sales prospects. CRM is frequently used to synchronize sales activities. While CRM is intended to accomplish such goals, the currently available technology fails to meet substantial scheduling, communications, and relationship management needs of individuals and businesses.

BRIEF DESCRIPTION OF THE DRAWINGS

The following aspects of the disclosure will become more readily appreciated as the same become better understood by reference to the following detailed description, when taken in conjunction with the accompanying drawings.

DETAILED DESCRIPTION OF SPECIFIC EMBODIMENTS

Figure 1:
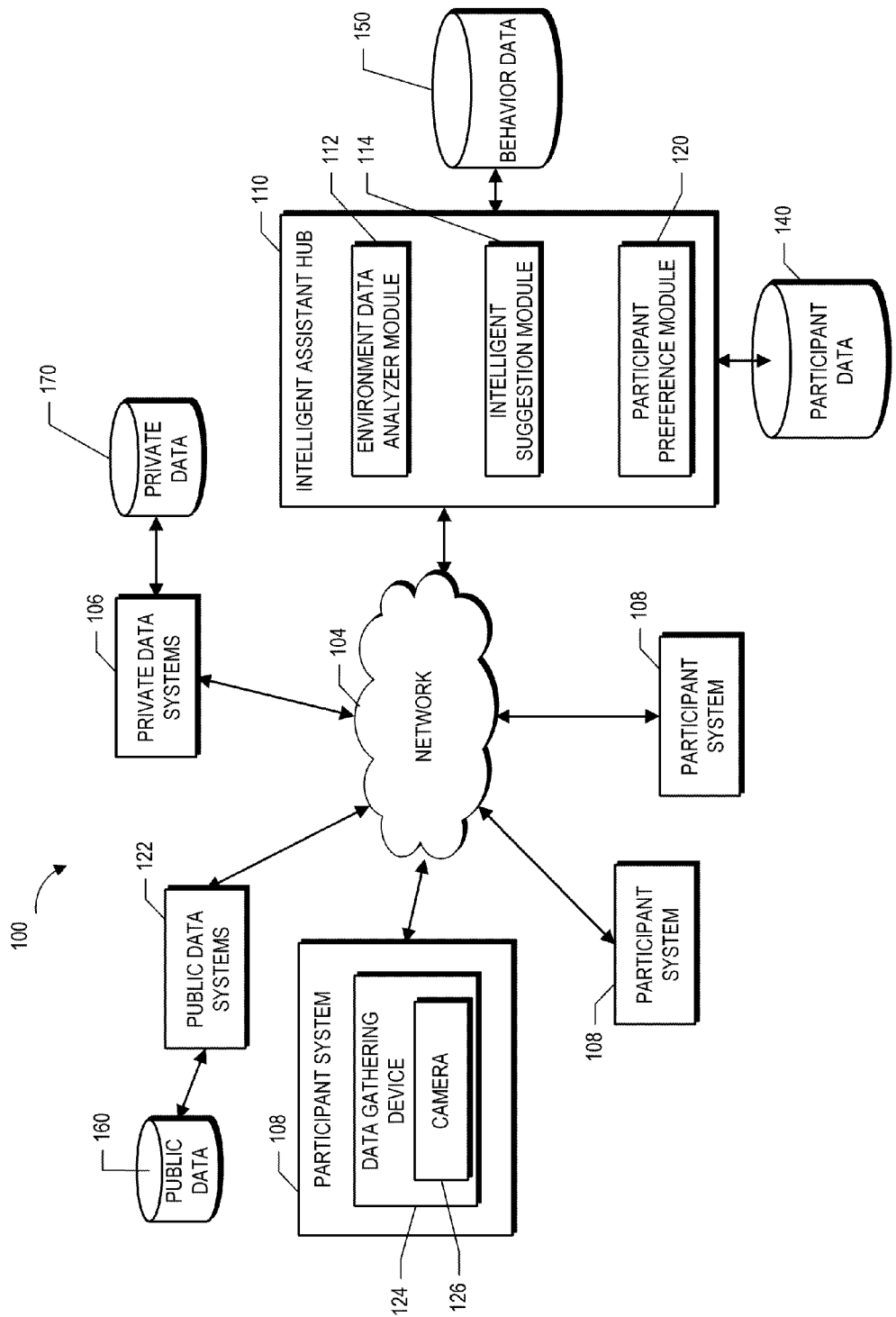
FIG. 1 is a block diagram showing an embodiment of a computing environment to implement a situational and global context aware calendar, communications, and/or relationship management system.

The present disclosure presents a variety of methods, systems, articles and apparatuses for calendar, communications, and relationship management and enhancement. In one embodiment, a computer obtains and/or generates a data set and performs analysis to automatically determine whether proposed or attempted meetings or communications are contraindicated by correlations between the proposed or likely participants (where the term "meeting" or "communication" is used alone herein, it should be understood that each term includes the other, and that a "meeting" also references a desired or proposed meeting). Similarly, proposed or attempted meetings or communications, or alterations thereto, may be suggested by the intelligent assistant hub system, described with respect to FIG. 1 below, based on one or more correlations between the data set and the participants in the meeting or communication. In one aspect, the system may identify the likely acceptability of meeting times by ranges (such as 1 to 10) or groups (such as "clear", "possible issues", "likely conflict", and "known conflict").

Although meetings or communications may be between pluralities of people (participants), the term "Meeting Partner" (or primary participant) may be used to indicate the person with whom the system (or a user of the system or method) is attempting to communicate or set up a meeting with. While Meeting Partner is grammatically singular, it should be understood herein that even when used in the singular, it includes a reference to more than one person, as in the case of a meeting set up between a user of the system and ten other people.

In one embodiment, a user (primary participant) who will be in Brazil from Apr. 20-24, 2011 may wish to set up a meeting with a participant who is an observant Jew and a participant who is a vegetarian. The system can obtain data pertinent to the potential participants, for example by being provided data, by analyzing public and private sources, by analyzing social media such as by analyzing the Twitter™ feed of participants, etc. When the user attempts to send a meeting invitation for April 21, the system informs him that it is Tiradentes' day, a public holiday in Brazil. When the user attempts to schedule for the evening of April 22, the system warns him that April 22 is a Friday and one of the participants has indicated on Twitter that he is an observant Jew, and for observant Jews, Shabbat prevents working after sundown, which is 5:34 p.m. The system may then inform the user of the best meeting time or times, considering traffic patterns, likely times that participants will be tired due to jetlag (having calculated their prior time zone, if available how long they had been in that time zone, and how long they would have been in the meeting time zone prior to the proposed meeting time) or other factors (such as the length of time between the last flight together with the length of the flight, and even class of service, which together provide clues as to likely participant fatigue), the schedules of the participants, the conflicts with local holidays or traditions, the conflicts with participant holidays, traditions or observances, venue availability, cost of transportation to the proposed meeting place as it varies with date and time, and cost, availability, and condition (such as how crowded a restaurant may be) of the meeting place.

In one embodiment, the system may use real time data. For example, if a primary participant's meeting is in downtown Los Angeles and the participant is in Santa Monica, the system can alert the participant to leave at a particular time, taking into account current traffic, predicted weather, participant's driving history and average speeds, the importance of being on time (more conservative v. less conservative departure time), and/or other factors. In some cases, as the participant is running late, the system could alert the participant to drive faster and/or notify the other participants of the participant's status, etc. The system can also be connected with GPS data and could inform the participant if she has taken a wrong turn or assist in directions to get to the meeting. The system can also alert the participant if the meeting time is modified by other factors, for example, if other participants are also running late. The system can balance meetings by priority, so if other participants of the meeting are running 30 minutes late, it may send a cancel notice to those participants or prompt to send a cancellation notice so that the primary participant is not late for another meeting. In one embodiment, if the meeting is cancelled, it should rearrange the primary participant's schedule and notify.

Among other factors, the system may incorporate data (which can be understood as including both planned and predicted data) about national holidays, cultural holidays, exchange rates, climate forecasts, climate patterns, the statistical likelihood, for certain times and places, of climate extremes such as monsoons or hurricanes, actual predicted climate extremes, long-term climate trends, special events, strikes, civil unrest, travel restrictions, travel safety, reliability, nature, availability and cost of travel to a destination, reliability, nature, availability and cost of travel within a destination, political events, political stability, geopolitical threats, proposed or pending laws or regulations, legality of transport of required or desirable items, such as prescription medicines, to a proposed destination, cost, and availability of local talent, communications and infrastructure availability, nature, cost, and reliability, availability, nature, cost and reliability of translators, similarity between local language and participant languages, and frequency with which persons likely to be encountered during travel (such as cab drivers) speak the participant's language sufficiently to avoid errors or misunderstandings.

In one embodiment, the system may have access to a data set with public and/or private information about the participants in the meeting or communication. An embodiment of a method of populating the data set is described below. For example, public data systems/public data sources such as the Google™ search engine, Google+™, Facebook™, LinkedIn™, the Bing™ search engine, travel sites (sites herein may include databases), airline sites, sunrise/sunset calculation sites, Wikipedia™ or other general data sources, IP address geolocation sites, name analysis sites such as ones that provide an inference about age, religion, national origin or other characteristics based on name, genealogy sites, personal data compilation sites, traffic tracking sites, weather tracking sites, weather prediction sites, real-time and historical flight data sites, and Twitter™ may be sources of information. Some information may be input directly, such as a database of holidays for certain countries. Other information may be determined programmatically, such as sunrise or sunset times. A further aspect may include obtaining and/or sharing such data via at least one application programming interface ("API"). A further aspect may include obtaining data by impersonating a user of a service, such as by utilizing the Facebook™ or LinkedIn™ credentials for the user on whose behalf the system is operating. In one aspect, the terms of service for sites may be categorized, either programmatically, manually, or by a combination thereof to determine whether such impersonation or other access is acceptable. In one implementation, terms of service and applicable laws may be analyzed, and/or a database of pre-analyzed terms of service and/or applicable laws accessed, and a determination made as to whether a particular data source may be utilized.

Additional data sources may be utilized. For example, Lexis/Nexis™ and other paid and/or private data systems/sources are available.

In one aspect, previous presentations, PowerPoint or similar presentations, speeches, and other data may be utilized. In one aspect, video and photographs may be identified using face recognition technology, and voice data may be identified using voice recognition technology. The content of the data may also be analyzed to identify the origin and relevant data within such content.

A further aspect may include caching some or all such data and refreshing the cache after a certain amount of time (or in conjunction with the first use of the data after the passage of such amount of time), and/or after the occurrence of certain events, which amount or events may vary by data source and/or analysis target. A further aspect may include refreshing the cached data after different amounts of time depending on the type of meeting or communication or whether the cache contains sufficient data. Such caching policies may be combined in whole or part. A further aspect may include identifying the most recent geographic location from one or a plurality of data sources, where such data sources include geographical location of a user posting data (or associated with posted data). A further aspect may include identifying any people recently or currently with another person, which data may be obtained from data sources that record that one person is near or with another person. Proximity in time and place may be used to infer that people were at or near the same location at the same time. Uses of such data include an automated system to identify associations between people, identify witnesses to an event, allow emergency messages to be sent to persons who are near the person intended to receive the message, to detect improper contact (such as monitoring a parolee who is not permitted to be near children or a person who is subject to a restraining order), among other uses.

A further aspect may include monitoring network traffic (including via techniques such as packet sniffing, proxy server monitoring, monitoring at a router or switch level, cached data analysis, screen scraping, a browser plug-in that accomplishes or assists in data capture, or other methods. In an aspect, monitoring may be limited to the capture of data meeting certain criteria, such as data useful for the systems and methods described herein.

A further aspect may be the establishment and/or use of a network of wireless MAC address detectors, wireless network detectors (in particular with reference to mobile hot spots), and other mechanisms capable of identifying a unique or likely unique wireless identifier or transmission. Such detectors would report such data and the data may be utilized to infer the location of a person, or of some number of persons within a group of persons with access to the device emitting the unique or likely unique identifier or transmission.

A further aspect is analysis of other available data, such as analysis of files stored locally or over a network and available to the user. In one implementation, files not generally available to the public, such as over a non-authenticated internet connection, but available to a user or organization, would be indexed or mined for data. In one aspect, only data useful for the systems and methods described herein would be obtained.

It should be understood that while various aspects describe access to, or analysis of, very large amounts of data, a far smaller set of data may be utilized. Indeed, in one implementation only data manually input by a user may be utilized. Similarly, regardless of what data may be utilized to begin with, the system may be programmed to heuristically determine additional data and/or to determine the relevance of extent data. For example, a user who always rejects meeting invitations taking place after sunset on a Friday but before sunset on Saturday may be scored as likely to be an observant Jew. While a more simple scoring mechanism (such as "unlikely to accept Friday night meetings") may be useful as well, it does not provide the additional data associated with a determination of the cause of the scheduling pattern. Identifying the cause—in this case, that the user is likely an observant Jew—allows the system to provide additional guidance, such as arranging a meeting at a restaurant that has Kosher options available. Two or more individuals exhibiting similar patterns (or who are related) may be inferred to be more likely to share other patterns, particularly where there is insufficient data about at least one of the individuals with regard to such pattern.

Data from Facebook™, Twitter™ and certain other services feature status updates that include very current data, often including the geographic location where an update was posted from, the time and date of an update, and, in some cases, the people who are with the person posting the update. Indeed, services such as Foursquare™ and Facebook™ allow people to expressly "check in" to locations and post that information to publicly available databases (note that in some cases, data access may be restricted by user choice, privacy policy, or for other reasons). Where data about one person is not available, known associates of that person may be used as search keys to determine if they have indicated where the person is located or has been located. Even without an express indication, an inference may be made based on past activity. In one aspect, an application running on a (portable for the most part, although fixed may work when reporting when a user returns to a known location) device may be used to communicate with the system as to the location of the user. Venues may report the presence of computers or devices hooking up to (or visible to) their networks via MAC address or other unique code.

With regard to caching policy, in one aspect current status updates may be retrieved every time the system is utilized. In another aspect, once a sufficiently current update (or other data point) is found, the system may be programmed to cease searching additional databases for the same data. For other data, such as a person's religion, caching policy may dictate that the information only be refreshed at lengthy intervals, only when the information is retrieved as part of another search, or by the sooner of the two to occur. Note that data collection or analysis via the analysis of cached data, such as in a user browser, in order to populate one or more of the data sets is normally a completely different cache than used by the system, although in certain cases there may be partial or full sharing of cache contents or space.

Cross-updating of records is an additional feature that may be present in some implementations. For example, if Joe's record was last updated ten days ago and is thus within the "use cached data" window, but updated data about Joe is retrieved in the course of obtaining data about his officemate Fred, Joe's data may be updated as well.

In one aspect, a data set is populated with associates of the primary person or persons with whom communication or a meeting is desired. Data on such associates may be tracked and correlated with the primary person or other associates. Similarly, data incidentally obtained pertaining to associates of a person may be stored in a cache or database in order to reduce the requisite data retrieval in the event that data about that associate or associates needs to be obtained in the future (such as if that associate accompanies the primary person to a meeting).

In one aspect, heuristic, correlation, or other analysis of communications may be utilized to determine the characteristics of a communication that receives a desired type of response. For example, emails sent to a user that are under 100 characters long may receive a brief but fast response. Similarly, emails sent to a user after 3:00 p.m. on a Wednesday may never be returned before Thursday morning, and even then are returned with a brief response. The user may be asked to rate or categorize the type of response in order to populate such a database. Alternatively, or in addition, automated analysis may be done to rate or categorize the type of response. In one aspect, the utility of the response may be measured by the way the user utilizes or interacts with it. For example, responses that frequently elicit a meeting scheduling request, a lengthy response, or a long time spent reading the response may be scored accordingly.

Users may also "vote" or rank the quality of system performance in order to provide additional guidance for the system to adjust its rating system and behavior.

The volume and type of inbound communications from a sender may be utilized to determine characteristics about the sender, which characteristics may additionally be used to further improve the predictive capabilities of the system. It should be understood that acceptance, type of acceptance, characteristics of acceptance, non-acceptance and characteristics of non-acceptance of outbound communications to the person being analyzed may be utilized in addition to, or in place of, inbound communications for these purposes. In one aspect, telephone records, SMS records, email records, Facebook™ communications records and other records may be analyzed to determine when communications take place, the type of communication, the modality, and other characteristics. For example, the system may analyze such records and determine that on 95% of days, no communications come from user Joe between 3:00 p.m. and 3:50 p.m. on Wednesdays, and may infer that Joe has a recurring appointment during those times. Similarly, the system may determine that communications with Joe occur via work line 80% of the time before 5:00 p.m. on workdays, by cellular phone 80% of the time after 5:00 p.m., 50% of the time by cell and 50% of the time by home phone after 6:00 p.m., and 99% of the time from the home phone after 7:00 p.m. The system may also determine the normal commute time between Joe's work and home (and may even use traffic, weather or other data for specific days on which communications being analyzed took place) and may infer that Joe normally leaves work at or around 5:00 p.m., sometimes stops on the way home, and is almost always home by 7:00 p.m. Accordingly, the system may route communications in a manner that accommodates the travel schedule (for example, by not sending SMS messages during Joe's commute time if Joe lives in a state where it is illegal to text while driving, by holding the transmission of text or email messages until the normal commute time has expired, by routing a phone call to the most likely phone system to answer, by warning the sender of Joe's schedule or seeking sender permission before altering the communication, or otherwise).

Feedback provided by potential meeting request or communications recipients, either with regard to a message sent by the system or by another method or by another user may be analyzed to determine additional characteristics of optimal communications or scheduling with such recipient. For example, if a recipient posted on Twitter™ "Don't you hate idiots who schedule while the Dodgers are playing?", future meeting requests may be correlated to not be sent requesting a meeting during a Dodgers game. If there was already a meeting request outstanding to such recipient in violation of the new preference, it may be withdrawn automatically, rescheduled automatically, or rescheduled with the consent of one or more participants.

Physical requirements may be compatible only in certain sequences. For example, when scheduling a meeting at a coffee shop, a networking basketball game, and a meeting in an office, the clothing required for the office meeting would be incompatible with that for the basketball game; if the basketball game preceded either of the other meetings, the person would need time to shower and care would need to be taken to make sure that the temperature in any immediately following meeting would not be so high as to trigger sweating as a result of the increased metabolism following exercise. In one implementation, the system would incorporate such requirements into the scheduling.

In scheduling meetings or even travel, the physical environment and of the meeting participants (such as clothing) at each stage is of importance. In addition, desirable physical characteristics vary with cultural norms, cultural expectations, legal requirements, the physical characteristics of the person, the clothing worn or available to the person, and the preferences of the person. In one implementation, the likely temperature or temperature range in one or more potential meeting venues (or routes, hotel rooms, etc) may be used to advise as to clothing to bring, to properly sequence events, to choose between a plurality of potential locations, etc. The system may utilize actual temperature or other data to replace projected data where actual data is available. For example, average hotel temperatures, the availability and types of hotel climate control, presence of patio heaters or misters at outdoor restaurants, average restaurant temperature may all be utilized to manage travel, meetings, and other events. Indeed, such information may be used to determine an appropriate place within a location, such as by reserving a table near the entrance in a restaurant that is overheated in the winter. Where meetings happen by audio or videoconference, the system may automatically correct errors or may augment features of the participants. For example, a man having a meeting with an orthodox Jew may offend that participant by not wearing head covering. The system may automatically add head covering to the transmitted digital image. Similarly, accents may be corrected, "pause words" such as "um" and "you know" may be eliminated, and other elements corrected. By maintaining a database of such information and/or gathering such information as needed, the system is able to better meet the needs of its users.

Sometimes data is not available in the form required. For example, the temperature in a restaurant may not be available to the system. The system may pull images, video, audio, and text from various feeds such as Facebook™ and Twitter™, and/or from image search engines such as that provided by Google™. Such searches would, in one implementation, be limited to images bearing metadata indicating they were taken in the location at issue; to data that references the location at issue; or to posts or data meeting other search criteria. A data range or other limitations, such as matching a time of day or time of year, may also be implemented. The images and/or other data may then be analyzed to infer data in the form required for the system to analyze, to obtain direct data that the system or its users require, or to confirm the validity of extent data within the system. For example, if there were a meeting a "Joe's Steakhouse", the system might examine images recently taken within Joe's Steakhouse and observe that diners close to the kitchen and along the wall opposite the door were 50% more likely to remove their sweaters or coats than were visitors proximate to the door or windows. Similarly, the system might observe that drinks with ice were more likely to see that ice melt quickly at tables close to the kitchen, and that diners close to the kitchen were more likely to order cold drinks. Such information may be correlated to infer that the area near the kitchen is warmer than the area near the door and such information may be used by the system to guide reservations, to recommend table placement requests, or for other reasons. In one implementation, the system analyzes the data to identify individuals similar in weight, height, age, body type, gender, place of residence, or other factors and determines how the similar cohort is dealing with the venue. If, for example, a potential dinner meeting participant with a body mass index (BMI) of 45 were considering multiple venues, it would be informative to know among people with a similar BMI in images taken at the potential venues, the amount of sweating was lowest at venue A.

Additional data that the system may analyze would include public records related to the potential venue. For example, building permits issued for locations at or near the venue may indicate potential disruption or noise near the venue. Business licenses, restaurant health inspections, critical reviews, reviews by laypeople, and other similar data related to the potential venue or places enroute to the potential venue (including conveyances) may all be used by the system.

In another aspect, photographs, purchasing records, videos, and other data about other participants in a potential meeting or event (or in some cases those associated with participants) may be analyzed to determine appropriate clothing or other factors. Such data may be correlated with a database about the user of the system, with data provided by the user of the system, or a combination thereof. In one example, Jill is going to attend a networking event. The system has some data about Jill's available clothing, and Jill takes a photograph of the potential clothes she is considering wearing to the event. The system then analyzes the available data, such as images, of other participants and determines whether any of them wore identical or substantially identical clothes. In so doing, the system may then provide Jill with an analysis of the likelihood that she will show up at the event and find somebody else wearing the same outfit. Similar analysis may be done for other things. In one implementation, analysis of photographs, purchasing records, and other data may be utilized to determine whether a potential recipient of a gift already has something identical or similar to the potential gift; whether the potential recipient has a possession that can be used to identify a complimentary gift (such as shoes that match a certain outfit, or a game that works with a particular gaming system), and/or the preferences of the potential recipient. In one example, a business associate's child may have been photographed playing with various toy trains, but no photograph showed the hot new toy train, "Example Train". In such a case, the system may identify "Example Train" as a potential gift. In addition, such a system may be utilized to pre-populate, add to, or otherwise enhance gift registries or similar lists. For example, using existing photographic data or photographs taken for that purpose, a couple may photograph their kitchen utensils, pots, and pans and the system would then identify the existing things in the kitchen, evaluate where possible which of those items have aged, are of poor quality, or otherwise would be good candidates for replacements, and desirable items that are not present in the data set. Such items may then be added to the data set, presented to the user for approval prior to addition, or noted within the dataset as automatically generated.

Images, video data, and other data regarding events that are not yet readily available in the expected databases may be used to supplement the data available to the system. For example, a photograph with metadata indicating it is 8 hours old and showing a "street closed for street fair all weekend" sign may be used to supplement road closure data available from Garmin™.

Images, video and other data may also be utilized to identify people who are associated with each other, organizations, or activities (face recognition technology may be utilized among other things). Similarly, expected clothing and appearance elements, such as the presence and type of facial hair, whether all women at a certain location wear burkas, common clothing and head coverings, etc., may be utilized by the system to identify suitable participants and/or to provide information or guidance to participants.

Indeed, video and audio data may additionally be utilized to determine whether potential participants have accents, speak a certain language or dialect thereof, speak slowly or quickly, speak softly or loudly, etc. Similarly, venues may be identified as having good or bad acoustics and having loud or quiet ambient sound (including music or televisions). Such information may be used by the system to identify and/or prepare participants. For example, a person with slight hearing loss meeting with a person with an accent and who speaks softly may be advised to avoid certain venues with high levels of ambient noise. The system may also compare these factors and determine whether assistive devices and/or translators will be required, and if so, what type of devices or translators.

Additional information may be gathered from various data sources and incorporated into the system. For example, how people similar to meeting participants (body type, cultural background, educational background), or the meeting participants themselves, normally sit or participate at meetings. In one example, somebody who fidgets may be preferentially seated near the end of a table, while a person who typically speaks softly but contributes significantly to the process during meetings may be seated toward the center of a table. Cultural analysis may also be done as to how to arrange seating (for example, a person with the habit of crossing their legs in a manner that shows the bottom of their foot to the person on their right may be seated at a place where there is too little room to cross their legs should the meeting also include a participant (or likely include a participant) from a culture where showing the bottom of a foot is considered an insult. Actual table shape, or the expected table shape for a specified location, may be incorporated as an additional factor.

The system may also utilize various data sources, including real time traffic data, 3D models, data from drones, helicopters and other sources. For example, a sensor mounted on a drone may show poor air quality up to 1,000 in the Los Angeles basin. In such a case, a meeting set for downtown may be moved to a venue in the hills above the 1,000 foot line.

Similarly, activity on a social networking system may be used as indicia of when a user is utilizing a computer (as may availability on an instant messaging program or when a user sends or receives emails). Such cues may be utilized to determine when a message should be sent via email or when it is unlikely to be read by email so should be sent via another mode, such as SMS. Similarly, cues in the messages (such as email headers or notes in an email such as "sent from a mobile device") may be used to determine when email is likely to be read on a device other than a traditional computer (and optionally, what kind of device and device characteristics). Such information may be used to alter communication patterns with such user.

It should be noted that gathered information or cues may be used automatically, presented to a user for use in formulating messaging or meeting strategy, presented to a user only when a proposed action appears to conflict with gathered information or cues, or according to other formulations.

This system may be integrated into one or more social networking systems, may itself comprise one or more social networking systems, may incorporate data from one or more social networking systems, or any combination thereof.

In one aspect, an automated analysis may be made to determine and/or predict scheduling availability, schedule patterns, travel patterns, or other useful patterns. Among other data points, the system may analyze internet or network activity, email or meeting activity, indicia of real world activity (such as posts by a person or others describing a person's real world activity and/or schedules), and/or data gathered from real world sensors (for example, metadata contained in photographs may be utilized to determine where a person was at a given time and place; though it should be noted that metadata is defined herein to include the data itself where useful information may be gleaned from it such as may be obtained with facial recognition, identifying the person and/or others and/or objects and/or places in the photograph may be identified even if not identified in textual metadata). This analysis of a person's activity may be used for various purposes, including determination of appropriate advice, guidance, or programmatic activity with regard to scheduling and other communications.

The method may further include a communication to the user about the factors that were used to determine meeting or communication parameters. Such information may be useful to the user in determining additional factors, such as the content or nature of the meeting or communication. Such information may further be combined with additional information relevant to the meeting or communication.

When planning any interaction (whether in person, via live telecommunication, via message, or by other means) it is useful to determine what the likelihood is that a person will show up and/or respond, and if so, what to expect in terms of timeliness. For example, the system may analyze available data to determine the likelihood that a meeting will be cancelled or that one or more participants will not show up. Similarly, it may score the likelihood that an email will be replied to, and if so, the type of reply (length, cursory, or otherwise) and the delay to expect before a reply.

In addition, the system may provide timing windows based on predictions, past performance, and/or cultural factors. If, for example, it is unacceptable to be more than 5 minutes late for a meeting in a particular culture, when scheduling such a meeting, the system may provide additional warnings prior to the meeting or may schedule the meeting at an earlier time. In addition, the system may utilize mobile devices and/or interaction with fixed location devices to determine if the user is at risk of missing a meeting. For example, if a user has a meeting in downtown Los Angeles at 4:00 p.m., the system may determine that the user is at risk if the user is sitting at a computer located in Santa Monica at 3:00 p.m. (location may be determined with geo-ip, GPS, or other mechanisms). Similarly, if the user is in Santa Monica at 3:00 p.m. but is in motion (such as if a user's cellular device GPS indicates the user is heading eastbound on the 10 freeway), the user may not receive a warning unless the user becomes at risk for being late (such as by exiting the freeway and heading toward the beach). In one aspect, the system may automatically (or according to a ruleset) notify one or more participants (which may be limited to participants on the "same team" or meeting other criteria) that the user is likely to be late. The system may analyze cultural and/or situational needs to determine where notification is desirable. In addition, the system may take into account extrinsic information, such as historic or extent traffic conditions, in making determinations. When scheduling events or at other times, the system may warn if events are set with insufficient time to transition between events. Such warning may be triggered by a change to extrinsic information, such as a change to traffic conditions. Where there are cultural and/or situational preferences or norms with regard to early or late arrival, the system may identify a time window and warn the user (or a third party) if the user risks arriving outside of that window. The system may additional utilize GPS data, such as by warning a user who has arrived at the destination that they are more than 10 minutes early, which falls outside of the 5 minute window for early arrival.

It may also be desirable for the system to predict probabilities for particular outcomes. For example, a meeting between Hamas representatives and Israeli citizens may be ranked as likely to be unsuccessful unless dealing in one or more particular areas where there has been past success. In one aspect, available data may be utilized to set up a probabilistic model, and simulations may then be run to determine the likely range of outcomes.

Further, cultural factors are frequently overlooked in preparing for a meeting, in determining the appropriate content of a meeting or communication, in conduct within a meeting, in tone or other affect within a communication or meeting, or in other interactions. Similarly, cultural and other factors may significantly impact the ability of a person to arrive at a meeting in a timely manner and ready to work.

For example, cultures differ in expectations about personal space and proximity. In some cultures, standing too close to another person is viewed as rude, while in others it is viewed as proper. Standards for dress and appearance vary from culture to culture. Gifts and other tokens of greeting or appreciation may be interpreted very differently from culture to culture—such as where a person presents a rose when the particular flower is considered bad luck in that culture. The appropriateness of incorporating other activities into meetings, such as meals, varies significantly from culture to culture.

Indeed, in certain cultures there is an expectation that one participant will engage in activities that are illegal or highly inappropriate in the nation of another participant. In one example, a company from a country where women are not expected to be vested with decision-making authority may seek to hire a law firm in the United States, where such discrimination based on gender is illegal. Similarly, a businessman from one country may find his hosts from another country insulted when he refuses to socialize at a strip club. Indeed, even within a single nation, regional or religious differences may result in profound misunderstandings, such as where a Mormon businesswoman is invited to a business dinner with a heavy focus on alcohol.

Further, individual circumstances may make a meeting or characteristic of a meeting very uncomfortable for a participant. In one example, a vegetarian may find an invitation to dinner at a steakhouse uncomfortable. Similarly, a recovering alcoholic may have difficulty with an invitation to finalize negotiations over drinks.

Further, cultural attitudes toward working relationships may be analyzed or utilized. For example, a New Zealand company working with two allies, one from the United States and the other from Japan, would benefit from understanding that statistically, Americans are more likely to prefer a more individualistic working relationship, while Japanese are more likely to prefer a more collectivist working relationship. In one implementation, the system may take or give weight to such preferences in managing communications or meetings. Gender, religious, cultural, and national differences in such areas may be considered.

Where such factors are known to exist, the system would alter meeting parameters and communications content appropriately, and/or would warn the user that it has detected a potential conflict or a cultural, personal, or other nature. Where such factors are not known, the system described herein may make probabilistic assessments as to the likelihood that they exist. For example, a person with a history of travel to Israel and with a significant number of friends who keep kosher may be scored as likely to require kosher food.

In one implementation, multiple implementations of the system (or even with regard to different users within the same system) may make information available to trusted users. In such an implementation, User 1 may seek to set up a meeting with User 2. Optionally after seeking validation from User 2, or after checking to see if the users are "friends" or otherwise linked within a social network context, work for "pre-cleared" companies, or other factors, the system (or systems after an exchange of data) would utilize self-reported factors from each user to create an appropriate communication or meeting.

In one aspect, the system may craft meeting parameters by exchanging proposed meeting times, places, or other elements from one user to the other, and having the system automatically reject meetings with parameters that conflict with user preferences, cultural or otherwise. Such rejection may be accompanied by an invitation to suggest another time or other parameters, or by a suggestion of another time or other parameters. In addition, or alternatively, the system may initially pick a meeting time or parameter that complies with known facts and/or probabilistically likely facts about the other user.

In one aspect, the health and vaccination history of the user may be compared to the situation and risks in the place of the meeting (and in places visited in transit to the meeting), and alternate meeting places or times suggested. In addition, the system may provide a list of necessary health measures, such as shots or preventative pills or bringing antibiotics, that may be desirable. The system may also use the amount of medical preparation and risk as factors in weighting whether a place is appropriate for a meeting and/or in determining which of a plurality of locations and/or times is desirable.

Once a meeting has been set (or in conjunction with other communications or in conjunction with negotiating the meeting), the system may provide cultural and behavioral guidelines based on information about participants. For example, in preparation for a meeting with people from a nation where showing the bottom of a person's foot is considered an insult, such information may warn against doing so. In one implementation, the guidelines may be presented in order of importance or significance, and/or may include an explanation of such guideline and/or a score as to the relative significance of such guideline. Such guideline may, in one implementation, be presented as a "tips" sheet.

While the "tips" sheet may be presented electronically, on paper, or via any other mode of communication, and while the specific factors that are significant enough to include will vary based upon the needs of the individual and their industry, it may include some of the factors below:

| Global Guidance & Travel Checklist | | |
|---|---|---|
| Pre-Departure | In Transit | On the Ground |
| ☐Direct, Travel Agents and Online Services | ☐Airports and Travel | ☐Emergency numbers |
|     Fees |     Frequent flier sign up | ☐Services for travel arrangements |
|     Secrets |     Lounges (Business and First Class) | ☐How best to travel in groups or individual |
|     Seat selection |         Showers | ☐Political tendencies |
| ☐Hotel ratings, costs and additional fees |         What's free/what's not | ☐Baggage weight limits |
| ☐Computer useage and Internet access |         Credit Card Access (Amex, Specialty |     Fees for baggage |
| ☐Currency and conversion |     Cards) |     Carry on limits |
|     Use of credit cards |         Coach offerings |     US fluid policy |
|     International fees |         Leg room in exit row | ☐VAT and tipping expectations for taxis, |
|     Hidden currency |         In flight entertainment options | restaurants, hotels |
|     Notifying CC Company |         Secrets to booking shorter flights | ☐Language information |
| ☐Teach your team about currency with tips |         Security check points |     different definitions in different cultures |
| ☐Baggage weight limits |         Traffic time tables |     Languages spoken (Primary language) |
|     Fees for baggage |         Taxi/Bus usage |     Securing Translators |
|     Carry on limits |         Hailing a cab |     English spoken or not |
|     US fluid policy |         Paying for cab | ☐Telephone and Data |
| ☐Passport requirements |         Official vs Unofficial |     GSM, CDMA, Quadband |
|     Visas and time to secure |         Light rail/Rail/Boat (Venice) |     Roaming fees |
|     Entrance into and leaving a country |         Power |     Data fees |
| ☐Advise them on questions to ask | ☐Passport |     Access to data plans |
| ☐Establish framework for male/female |     Frequent Visitor benefits |     Email, texting, video conferencing |
|     Behaviors |     Visas (personal and business) | ☐Hotel ratings, costs and additional fees |
|     Cultural differences |     What to carry | ☐Finding long term accommodations |
|     Proper and improper actions |     Copying your passport in bags | ☐Currency conversion at banks or in transit |
| ☐Enlighten about food |     Recommended free time activities | ☐Customs |
|     On planes | ☐What's expected in down time | ☐Airline layout tools |
|     In restaurants |     Drinking and eating expectations |     Seat Guru |
|     Areas of concern | ☐Major holidays and issues | ☐Electrical plugs and converters (multiuse) |
| ☐Medical | ☐Terrorism | ☐Access to over the counter drugs |
|     Insurance you can purchase | ☐Car rentals | ☐Pick up a local paper |
|     Shots | ☐Hotel recommendations | ☐Travel insurance |
|     Diseases |     Safety recommendations | ☐Weather, Seasons, and Enviroment (+/−) |
|     Travel advisory |     Pricing and fees |     Humidity, Rain, Heat, Sun, Snow/Ice |
|     Medicines | ☐Credit Card holds and final payment | ☐Drinking water |
| ☐Learn to mimic behavior until you understand | ☐Be conscious of time differences with those you |     Bottled or tap |
| ☐Inform about heritage | are meeting. They may be tired for different |     Used to prepare food in restaurants, |
| ☐Individual economics | reasons. |     planes, ships |
|     Poverty, class system, wealth | ☐Behavioral differences | ☐People they may meet |
| ☐Police and military |     Eye contact |     Street |
| ☐Local customs |     Asking question |     Airport |
| ☐Packing requirements for women/men | ☐Drinking water |     Cities/towns |
| ☐Discount and travel cards |     Bottled or tap | ☐Local transportation fees |
|     Eurorail |     Used to prepare food in restaurants, planes, | Cab and cab colors (CC accepted?) |
|     AAA | ships | ☐Nightlife and Entertainment |
|     Amex, Visa, Mastercard, Discover | ☐Ear Plugs/Systems |     Safe areas, scams |
| | Upgrade lists | |

In one embodiment, such a sheet or "checklist" may aggregate all of the data needed for a meeting. In another, different lists may be provided for different portions of the meeting or different participants.

In one embodiment, a database of global guidance and travel is accessed by a portable device. The device incorporates some or all of real-time data, such as weather and traffic conditions and exchange rates with other data (real-time or otherwise), such as expected behavior, food, legal, and safety information. In one implementation, the database is updated in realtime utilizing GPS or other geolocation mechanisms. In a further implementation, where guidance is unclear (such as guidance as to language spoken when travelling near the border between the United States and Mexico), the one or more recommendations are presented and/or the best recommendation is presented and/or such recommendations are accompanied by scoring data, which data may be presented numerically or graphically (such as by color or intensity of the text display). In another implementation, current location data may be incorporated with calendaring information to provide recommendations, such as where a person is in Los Angeles but scheduled to fly to New York, where the system may include both warm and cold clothing on such list. In one embodiment, the system relies only upon schedule data and/or manually input data. In one embodiment, the system obtains schedule data from other sources, such as social network posts and emails. In one embodiment, the data is displayed as an "app" on a mobile device, which "app" may serve as the entire system, or may send some or all of the data to another system for analysis or use. In one embodiment, the system may also present (either as a "pop-up" from a background application, on demand, or otherwise) information useful to the traveler based on highly local data. For example, a traveler newly arrived in an airport from an international destination may be presented with a pop-up alert saying "If you are on a Y fare or higher, you are eligible for free use of the lounge". In addition, where elite or other travel memberships or status provide access, the system may direct users to such access (for example, first class lines or elite travel program security clearance). Where cellular phones or other mobile devices are utilized as payment systems, the database may be consulted (or a default value used) to determine a culturally or otherwise appropriate transaction parameter, such as a tip amount. Such parameter may be used to determine when the user is making a possible error (for example, "you are tipping 20%; traditional tipping here is 5%") and/or to directly input the data (for example, by automatically calculating the tip based on cultural expectations). Where individualized data (such as quality of service) as a factor in determining the parameter (such as a tip), the system may accept a rating (such as "rank the service from 1, excellent, to 5, terrible") and calculate an appropriate tip based on consideration of the individualized data in light of localized data for such parameter.

The system may also track travel documentation and restrictions. For example, if a person may only travel where dialysis is available, an attempt to travel to a nation where his insurance will not be honored, or where no dialysis is available, may be rejected or may result in a warning. Similarly, notification of the need for travel documents, such as a visa, may be made. Where the system has data about the user's extent travel documents, the system may automatically determine if the travel documents are adequate (for example, warning if a travel document will expire prior to the travel date). In addition, the system may track, plan about, and/or warn about acceptable payment systems. For example, if the user has only a Visa card and a Cirrus network ATM card, and is about to travel into a nation with a low level of Visa card acceptance and no Cirrus network ATMs will be near his planned travel route or destination, the user may be warned. In another variant, the user may be notified when he passes or nears the last facility for using a particular payment system and is not expected to be near another one for a set period of time (i.e. if the last compatible ATM machine is in the airport and the user is about to take a cab into the city, where no additional compatible ATM machines are found). Data about the relative comfort of various travel modalities may also be incorporated, such as by using data about in-flight humidity, seat pitch, or similar factors. Such factors may be further weighted by user characteristics, such as by reducing the weight attached to seat pitch for a very short user.

In one embodiment, such guidelines may be programmed into a computing system coupled to one or more environmental data gathering devices, such as a camera or microphone. In one aspect, one or more users may be provided with a display or communication device coupled to such computing system. The display or communication device may, but need not, be physically attached or virtually attached (such as by Bluetooth) to the environmental data gathering devices, although for near-real time operation of this embodiment, some form of connection is preferable. The display or communication device, the environmental sensors, and the computing system may all be incorporated into a single device, connected through a network, connected through a local connection, wired or wireless, or otherwise set to communication with each other whether in real time or with stored data. In the near real time implementation, the environmental sensors feed data to the computing device, the data is analyzed to determine what cultural or other guidelines are being violated or complied with, or appear close to being violated or complied with, and the user provided with such feedback via the display or communication device. In one implementation, such data is provided in order of importance. In another, only data of a set level of significance or higher is provided. In another, the required level of significance may be changed by the user, or, when the system determines (such as by analysis of voice tone or body language) that the meetings is not proceeding as expected or that there is a likelihood that some disruptive event likely related to compliance with cultural or other norms has occurred or is occurring. In one embodiment, a warning system minimally perceptible to other meeting participants, such as a vibrating watch, may be used to inform the user that the system has detected an issue. Additional information may be made available by the same device or another display or communications device. In one embodiment, a predetermined messaging system minimally perceptible to other participants is used where a number of specific behaviors are tied to a certain warning pattern, for example a single buzz indicating that the user is standing too close to another participant, a dual buzz to indicate that the user is showing the bottom of his foot, a triple buzz to indicate that the user is using an incorrect form of address, such as "Mr." when the correct term is "Your Honor", and a quadruple buzz to indicate some other issue has been detected. In one aspect, when another issue has been detected, additional information may be made available on a display system. The display system may include a heads-up display in eyeglasses, an audio display such as an earpiece, a Braille or similar tactile display, a display on a computer, phone or tablet device, or a coded display whether via one of those modalities or another modality. In one implementation, the display is polarized in a manner that obscures the message unless the user is wearing glasses capable or interacting with the polarized light in a set manner. In another implementation, the display is shown only when the environmental sensors show that other participants (or certain other participants) are not looking in a direction that would allow them to read the message. In another aspect, the system may provide real time translation. In one aspect, real time translation would be provided only for words, terms, or phrases more complex than a set grade level. In another aspect, translation may be provided only where the speaker talks in a manner more likely to be difficult to understand (such as where there is a heavy regional dialect). In another aspect, the system would track the alcohol intake of one or more participants (including the user), optionally considering actual or estimated weight of the participant, optionally considering the gender of the participant, optionally considering the estimated metabolization rate for each participant, and make available to one or more participants or other persons real time or non-real time data on likely blood alcohol level and level of impairment of the one or more participants. In one implementation a warning may be issued where the level exceeds a certain point. Additional data, such as nystagmus or lack of coordination, may also be noted, utilized, or incorporated.

In another aspect, the system may gather data about companies involved in a proposed communication, meeting or transaction, and utilize that data. In one aspect, the system may analyze data, such as public records data, to determine the frequency with which persons bearing certain characteristics have or succeeded at (or failed to succeed at), rising within a company, dealing with a company, entering into a profitable arrangement within a company, or otherwise productively dealing with the company. The nature of meetings or communications leading to such outcomes (or failing to lead to such outcomes) may similarly be analyzed. It should be understood that such analysis may also be done for individuals or groups of individuals as well as for companies. Data that leads to indirect inferences (such as data about shareholders) may be utilized as well.

For example, an analysis of public records may show that ExampleCo, a Florida corporation, has a fifteen member Board of Directors, twelve from the Southern states and three from Nevada. In such a case, a corporation trying to do business with ExampleCo might preferentially select to make contact through an agent with a Southern background or, failing that, an agent from Nevada. By contrast, if all members of ExampleTwoCo's board were from Japan, it would be scored as unlikely that approaching that company other than through a local Japanese agent would be successful. In certain cases, the system may (upon request or automatically) suggest similarly situated companies with a profile that makes a deal more likely (such as a company with a Board that is more diverse, or more similar to the user's company's board or the user's characteristics).

For further example, consider that ExampleCo may be a publicly traded U.S. corporation. An analysis of SEC filings may indicate that of the last 100 times ExampleCo filed a Form 8-K, 40% involved a deal with a company in China, 20% involved deals with a company in the United States, and the remaining 40% related to scattered events, none of which involved European markets. In such a case, a Dutch company looking to market ExampleCo's products in Europe may have an opportunity, but communications would need to be filtered through the lens of ExampleCo's experience. The system would account for such a need, for example, by giving additional weight to conflicts between Chinese and U.S. customs, on the one hand, and Dutch customs, on the other. In such an example, while behaviors that are normally discouraged in the United States but acceptable in China may be scored as less important to avoid than would be behaviors that are normally discouraged in both nations—even if the meeting is taking place in the United States and with only U.S. participants. In this case, because ExampleCo's agents are inferred to be used to dealing with Chinese companies, an inference may be made that engaging in a behavior that is normal during Chinese business meetings is less likely to be troublesome for ExampleCo than it would be for a company within a similar level of experience in China. In one aspect, such a weighting system may be additionally refined by looking to the personal experiences of the proposed meeting participants.

In a further aspect, elements common to deals with a target entity may be identified by the system and meetings or communications shaped to recreate or emulate some or all such elements. For example, if 80% of all of ExampleCo's recent press releases about big deals contained the term "significant European presence", it may be inferred that an approach to ExampleCo utilizing that term (or a similar term) may be preferable. In one implementation, similar terms may be automatically altered to make them more similar or even identical, such as by altering "big EU footprint" to "significant European footprint". Such alterations may also be made as suggestions to the user, optionally with an explanation and/or weighting providing to the user. In addition to press releases, other communications by or about a target company or person may be used. Language that is common to documents, web pages, and/or communications written by such target may also be automatically inserted into communications (or such insertion suggested to the user). If, for example, ExampleCo frequently uses the term "disruptive to the industry", communications containing analogous or somewhat analogous phrases, such as "industry altering" may be changed to "disruptive to the industry". Such changes may be made only where such change would not cause the phrase to appear within a selected proximity of the same phrase in the same document.

In should be understood that among other things, when the system gathers data about individuals, groups, cultures, and nations, such data may include customs, race, religion, beliefs, values, assumptions, attitude, family, generations, history, disease, geography, age, creed, color, rituals, height, weight, leisure, disabilities, genetics, arts, sex, ecosystems, modality, size, birthrate, language, accent, dialect, strength, adaptability, and life expectancy. When the system considers communications, meetings, and physical environments for meetings, additional factors would include whether the meeting is to take place on land, water, or in flight; traffic data, both real time and predicted; time zones; plants, including whether allergens, particularly where a participant is known to have allergies; geology, seasons, currents, amount and timing of sunlight; phase of the moon; wildlife, temperature; disease and epidemics and similar factors. The system would also consider business practices; supply chain issues; manufacturing capacity and expertise; financial issues; healthcare infrastructure; tools, models; fashion; housing; patents and patent system; trademark and trademark system; copyright and copyright system; research and development; food, education, energy, and similar factors.

Terrorist watch lists, lists of nations with which commerce is banned, and similar datasets would also be utilized in one implementation. For individuals or groups involved in certain industries, additional calendars or data may be checked. For example, a COO might be scored as less likely to be available just prior to the end of the fiscal year, a CPA might be scored as less likely to be available just prior to the end of the tax year, and an attorney's availability may be scored by checking court calendars for trial or hearing dates.

In another aspect, safety and security assessments may be utilized. In one implementation, generalized crime data may be utilized. In addition, or instead of, such generalized data, more sophisticated measures may be utilized, such as analyzing crime data by demographics (i.e. the number of people with similar demographics to the user who were victims), by date (for example, Mardi Gras may correspond to higher crime rates), by location, or by a combination thereof. Alterations may be made or suggested to travel plans, and/or advice given as to how to behave and/or appear, that mitigates such risk. Furthermore, measures of national, regional, and/or ethnic discrimination or otherwise disparate treatment may be utilized. For example, a Sunni Muslim visitor to a Shiite Muslim area may trigger additional risk scoring and/or changes to travel recommendations. In one implementation, communications by email or other electronic means may automatically be altered to reflect a name and profile that are more likely to obtain good results, whether by avoiding bias or otherwise. For example, if a woman named "Jane Smith" is communicating with a party who is likely to discriminate against women, the system may automatically alter her communications to reflect the name "John Smith". Another response may be for the system to create, either automatically, with human approval and/or input, or with a combination thereof, a fictitious additional persona for the user. Such persona may additionally minimize risk of discrimination, as by having "Jane Smith" automatically communicate via an artificial persona such as "John Washington". Where communications include voice and/or video, automated (in one implementation, real-time) alterations to the voice and/or appearance and/or mannerisms, and/or accents of one or more participants may be made. Such alterations may be made to make the artificial persona appear to be the one communicating. Such alterations may also be made to influence the likelihood that the communications will be received in a particular manner or understood or accepted. For example, a telecommunications device may alter a Boston accent to sound like a mid-west accent where it is determined or believed that such a change may be advantageous.

The system may also determine the reputation of the people and companies represented at (or present at, or proposed to be present at) a meeting. In one aspect, public data such as internet data reporting "scams" by companies may be utilized. An appropriate warning may be issued. In addition, where there is a risk (such as a company whose public records show a high level of litigation over contracts), additional participants (such as legal counsel) may be added or recommended.

In one aspect, the system may identify additional participants or communications recipients (either automatically or upon request). For example, if a meeting is being conducted with ExampleCo about bringing widgets to Europe, and a common contact for both parties is Jane Smith who has written a book about widgets, the system may suggest (or automatically include) Jane Smith.

In one aspect, records of charitable, political, and other giving may be utilized to generate data about political or charitable interests or preferences for people.

In one aspect, the system may utilize the available data to generate a scoring of likelihood of conflict, success, or other outcomes. For example, if a meeting is being set up between a businessman who is associated with Hamas and a businessman who regularly donated money only to Jewish politicians, even in the absence of any specific factors standing in the way of a meeting, the system may score the meeting as unlikely to succeed and provide the user with such information. Similarly, if a meeting to discuss sales of printer paper was being set up between ExampleCo and a Joe Smith of ExampleTwoCo, and public records show that Joe Smith has given the maximum amount legally possible to every Republican presidential candidate for the past 5 election cycles, as between ExampleCo's two possible representatives at the meeting—representatives who are otherwise equally well suited to the meeting but who differ in political orientation—the system would recommend, assign, and/or attach additional weight to the representative who was Republican. The significance attached to political differences, differences in hobbies, and similar differences that are colloquially seen as more likely to influence a friendship than a business relationship, may be increased when the meeting is between people from cultures where socialization is an expected or important part of a business deal. In cultures where participants "get right down to business", the weighting of political or similar disagreements, or lack of common interests, would be reduced.

Another aspect of the invention addresses several long felt needs in the field, including the ability to hold meetings at factories, shipyards, clubs, and other locations where there is a significant amount of noise, as well as the ability to hold meetings where participants are free to leave the immediate area, such as to inspect an item being discussed, without leaving the conversation. Existing conference call technology as well as blue tooth ear piece technology is well known, but falls short in this regard. There is an unsettling delay in between hearing a live voice and hearing the voice as transmitted over a conference call. Thus, it is not desirable to hold a meeting where participants all have earpieces connected via a conference call so that ambient noise can be overcome or so that participants can move around during the meeting. In one embodiment, the system provides a method of communication whereby a plurality of participants have equipment capable of receiving transmissions from other units, sending transmissions to other units, and determining whether the proximity of the transmitting unit is such that the user is able to hear the participant with the transmitting unit without receiving and playing that transmission for the participant with the receiving unit. For example, imagine that Abe, Belle, and Carl are having a meeting at a factory. Abe is known to have some hearing loss and has set his unit up to play sounds transmitted from other units when the ambient voice of the person wearing the other unit has more than a set likelihood of being incomprehensible to him (or he can actuate the unit manually). Belle walks ten yards away during a conversation. Abe's unit and Carl's unit detect her distance (whether by reading a GPS signal or location signal sent by the unit, reading the strength of the unit's signal, or measuring the sound and qualities of her voice, potentially in combination with measurement of ambient noise levels). Carl's unit determines that Carl can hear Belle without assistance, and does not re transmit what Belle is saying. Abe's unit determines that Abe needs assistance and plays what Belle is saying in Abe's ear. In a variation, the unit may record and/or retain and/or transcribe part or all of the conversation from one or more participants. In one use of such a variation, a participant may indicate to the unit that he or she did not understand what another participant said, in which case the unit may replay the sound for the user, may show a transcript of the sound, may alert the speaker of the problem, or may take similar measures.

While the inventions disclosed herein include substantial material not included in the claims below, some aspects of the inventions are further described in the following claims.

I. Decision Making System

Figure 2:
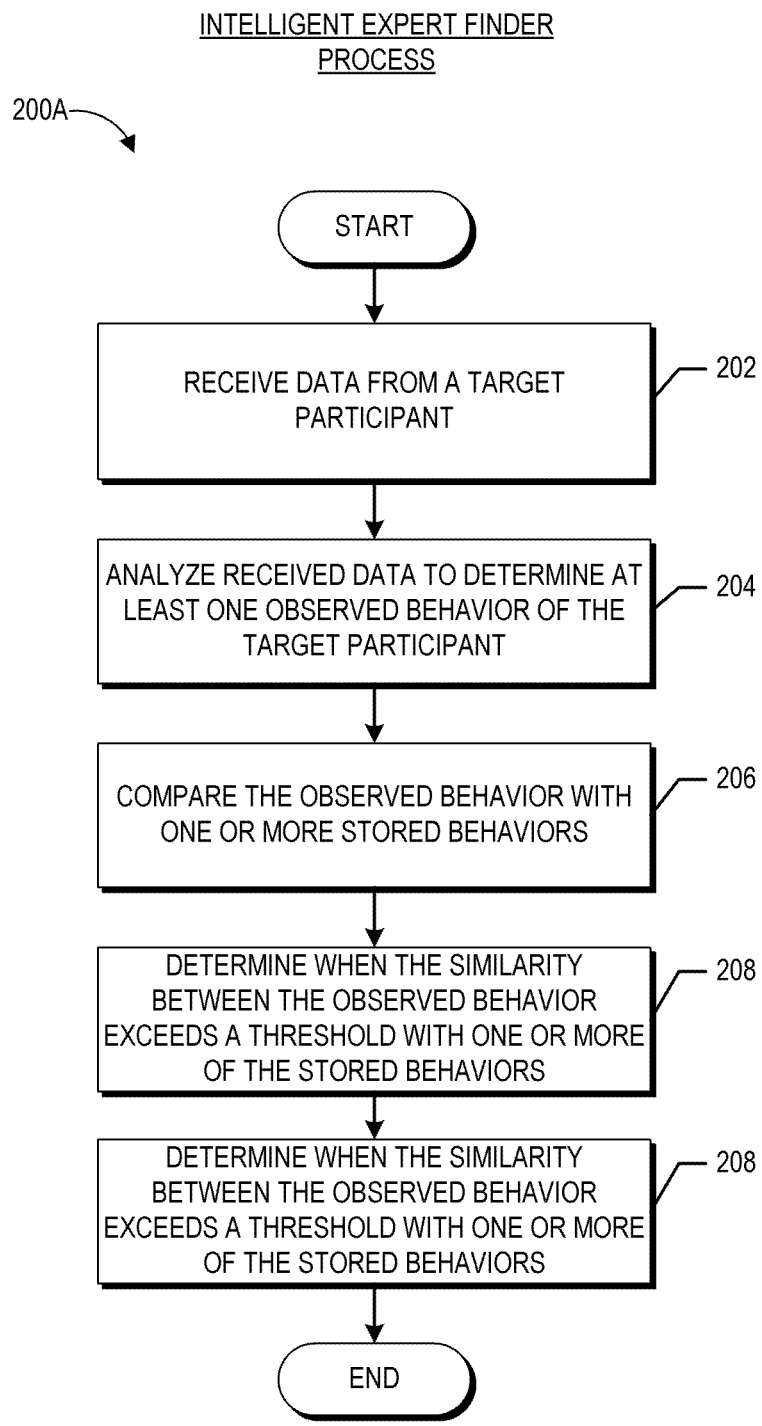
FIG. 2 illustrates an embodiment that may determine if an observed behavior matches a stored behavior.

FIG. 1 is a block diagram showing an embodiment of a computing environment 100 that can include an intelligent assistant hub 110 which communicates, via a network 104, with one or more participant systems 108, public data systems 122, private data systems 106, and multiple data sources 150, 160, and 170. The intelligent assistant hub 110 includes an environment data analyzer module 112 configured to analyze received data, an intelligent decision maker module 114 configured to determine and output at least one observed behavior, and a participant evaluations module 120 configured to access previously stored participant data. The intelligent assistant hub is configured to perform the method of FIG. 2 described above.

The intelligent assistant hub 110 is depicted as including several components or modules. These components enable the intelligent assistant hub 110 to perform a variety of functions. However, in various implementations, one or more of the components shown may be omitted from the intelligent assistant hub 110 or other components may be included. Each of the components shown can be implemented in hardware and/or software. In addition, the intelligent assistant hub 110 communicates with data repositories 140, 150 that include physical, non-transitory computer storage (e.g., magnetic, optical, volatile and/or nonvolatile semiconductor memory) for storing data related to operations of the intelligent assistant hub 110, such as participant data or behavior data.

II. Additional Embodiments

A number of computing systems have been described throughout this disclosure. The descriptions of these systems are not intended to limit the teachings or applicability of this disclosure. For example, the systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the systems described herein to be different types of devices, to include different applications, or to otherwise be configured differently. In addition, the systems described herein can include any type of operating system ("OS"). For example, the mobile computing systems described herein can implement an Android™ OS, a Windows® OS, a Mac® OS, a Linux or Unix-based OS, or the like.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the systems and methods. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. An apparatus, comprising:
    a device comprising a processor, a memory, and a network interface, wherein the memory holds instructions that, when executed by the processor, cause the device to:
        receive, from at least one environmental data gathering device, data about an interaction of a first participant with at least one target participant at a gathering of a plurality of participants;
        analyze the data to determine at least one observed interaction of the first participant with the at least one target participant;
        select one or more datasets of cultural behavioral expectations relevant to the at least one target participant, where relevancy is based on analysis of data derived from public and/or private data sources;
        compare the at least one observed interaction against the selected one or more datasets of cultural behavioral expectations relevant to the at least one target participant;
        determine when said at least one observed interaction exceeds a threshold similarity to at least one cultural behavioral expectation in said dataset; and
        communicate, to at least one notification device of the first participant, said at least one observed interaction, wherein the at least one notification device is a display polarized in a manner that obscures a notification message unless a user is wearing glasses capable of interacting with polarized light in a set manner.

2. The apparatus of claim 1, wherein the one or more datasets apply to persons meeting specified criteria.

3. The apparatus of claim 1, wherein the relevancy is based on data from one of Facebook or LinkedIn and access to the one of Facebook or LinkedIn is accomplished by utilizing credentials for the user on whose behalf the apparatus is being operated.

4. The apparatus of claim 1, wherein the at least one environmental data gathering device is a camera, and wherein the at least one observed interaction is a distance between the first participant and the target participant.

5. The apparatus of claim 4, wherein the camera is coupled wirelessly to the device executing the instructions.

6. The apparatus of claim 1, wherein the at least one cultural behavioral expectation in the dataset is a socially desirable or undesirable behavior.

7. The apparatus of claim 1, wherein the at least one cultural behavioral expectation in the dataset is a culturally desirable or undesirable behavior.

8. A computerized method comprising:
   selecting one or more datasets of cultural behavioral expectations relevant to at least one target participant, where relevancy is based on analysis of data derived from at least one of public data systems, public data sources, private data systems, or private data sources;
   receiving, from at least one environmental data gathering device, data about an interaction of a first participant with a target participant at a gathering of a plurality of participants;
   analyzing the data to determine at least one observed behavior of the first participant with the target participant;
   identifying a dataset of cultural behavioral expectations relevant to interactions with the target participant;
   comparing said at least one observed behavior against the dataset;
   determining when said at least one observed behavior exceeds a threshold similarity to at least one cultural behavioral expectation in said dataset, wherein the threshold similarity is determined by the strength of the correlation between the at least one observed behavior to the at least one cultural behavioral expectation in the dataset; and
   communicating, to at least one notification device of the first participant, said at least one observed behavior, wherein the at least one notification device is a display polarized in a manner that obscures a notification message unless a user is wearing glasses capable of interacting with polarized light in a set manner.

9. The method of claim 8, wherein the relevancy is based on data from one of Facebook or LinkedIn and access to the one of Facebook or LinkedIn is accomplished by utilizing credentials for the user of the computerized method.

10. The method of claim 8, wherein the dataset applies to persons meeting specified criteria.

11. The method of claim 8, wherein the at least one environmental data gathering device is a camera, and wherein the at least one observed behavior is a distance between the first participant and the target participant.

12. The method of claim 8, wherein the stronger the correlation, the lower the threshold similarity.

13. The method of claim 11, wherein the at least one camera is coupled wirelessly to the device executing the instructions.

14. The method of claim 8, wherein the at least one behavior is alcohol consumption, and the communicating is a message indicating the blood alcohol level and/or level of impairment based on one or more of actual or estimated weight, gender, or estimated metabolization rate.

15. A non-transitory computer-readable storage, comprising instructions executable by one or more processors to perform a method comprising:
   selecting one or more datasets of cultural behavioral expectations relevant to the at least one target participant, where relevancy is based on analysis of data derived from public data sources;
   receiving, from at least one camera, data about an interaction of a first participant with a target participant at a gathering of a plurality of participants;
   analyzing the data to determine at least one observed behavior of the first participant with the target participant;
   comparing said at least one observed behavior against a dataset of cultural behavioral expectations;
   determining when said at least one behavior exceeds a threshold similarity to at least one cultural behavioral expectation in said dataset, wherein the threshold similarity is determined by the strength of the correlation between the at least one observed behavior to the at least one cultural expectation in the dataset; and
   communicating, to at least one notification device of the first participant, said at least one observed behavior, wherein the at least one notification device is a display polarized in a manner that obscures a notification message unless a user is wearing glasses capable of interacting with polarized light in a set manner.

16. The non-transitory computer-readable storage of claim 15, wherein the at least one cultural behavioral expectation in the dataset is a socially desirable or undesirable behavior.

17. The non-transitory computer-readable storage of claim 15, wherein the dataset applies to persons meeting specified criteria.

18. The non-transitory computer-readable storage of claim 15, wherein the at least one behavior is alcohol consumption, and the communicating is a message indicating the blood alcohol level and/or level of impairment based on one or more of actual or estimated weight, gender, or estimated metabolization rate.

19. The non-transitory computer-readable storage of claim 15, wherein the at least one camera is coupled wirelessly to the device executing the instructions.

20. The non-transitory computer-readable storage of claim 15, wherein the at least one cultural behavioral expectation in the dataset is a culturally desirable or undesirable behavior.

* * * * *